US006795191B2

(12) United States Patent
Barbehenn

(10) Patent No.: US 6,795,191 B2
(45) Date of Patent: Sep. 21, 2004

(54) ULTRASONICALLY ASSISTED OPTICAL MEDIA SENSOR SYSTEM

(75) Inventor: George H. Barbehenn, Gilbert, AZ (US)

(73) Assignee: Freescale Semiconductor, Inc., Austin, TX (US)

(*) Notice: Subject to any disclaimer, the term of this patent is extended or adjusted under 35 U.S.C. 154(b) by 293 days.

(21) Appl. No.: 10/038,983

(22) Filed: Jan. 4, 2002

(65) Prior Publication Data

US 2003/0128265 A1 Jul. 10, 2003

(51) Int. Cl.[7] .............................................. G01N 29/16
(52) U.S. Cl. ........................... 356/445; 73/159; 73/597
(58) Field of Search ........................... 356/445; 73/159, 73/597

(56) References Cited

U.S. PATENT DOCUMENTS 3,700,903 A * 10/1972 Adler et al. ............. 250/222.1
3,791,744 A * 2/1974 Erny et al. .................. 356/432
5,025,665 A * 6/1991 Keyes et al. .................. 73/597
5,814,730 A * 9/1998 Brodeur et al. ............... 73/597
5,856,833 A 1/1999 Elgee et al. .................. 347/19
6,115,127 A * 9/2000 Brodeur et al. ............. 356/503
6,543,288 B1 * 4/2003 Blouin et al. ................. 73/643

* cited by examiner

*Primary Examiner*—Richard A. Rosenberger
(74) *Attorney, Agent, or Firm*—Posz & Bethards, PLC; Charles W. Bethards

(57) ABSTRACT

A print media sensor (10) according to the present invention determines a print medium type by utilizing an ultrasonic transducer (22) to vibrate a print medium (28) at a resonant frequency of the print medium (28). The print medium (28) is irradiated with light from an LED (20). Sensors (24, 26) measure the amount of light reflected from and transmitted through the print medium (28) while it is being vibrated at the resonant frequency. The ratio of the reflected to transmitted light is compared to a stored table of ratios that are associated with the resonant frequencies of specific print medium types and print medium ink volume and application rates. The results of these comparisons are used to determine the print medium type and the associated ink volume and application rate to be used for printing on the print medium (28).

19 Claims, 3 Drawing Sheets

ULTRASONICALLY ASSISTED OPTICAL MEDIA SENSOR SYSTEM

BACKGROUND OF THE INVENTION

1. Field of the Invention

The present invention relates generally to media sensors and, more particularly, to a media sensor system for determining a print medium type based on characteristics of the print medium when vibrated.

2. Description of the Related Art

A conventional non-impact print device such as an inkjet printer prints indicia on a print medium with a certain associated ink volume and application rate. This ink volume and application rate must be adjusted in accordance with the print medium on which the indicia are being printed. For example, a print medium, such as paper, is durable, highly absorbent and dries quickly, and therefore only requires application of a relatively small amount of ink over a short period of time. However, a more fragile and less absorbent medium, such as a plastic overhead transparency, requires application of a large amount of ink for saturation purposes over a longer period of time to allow proper drying of the ink without associated puddling. Therefore, the ink volume and application rate associated with an overhead transparency differs significantly from that of paper.

Presently, a user can adjust the ink volume and application rate of a printer by utilizing a printer control software program that is typically stored at a personal computer. However, if the user inadvertently forgets to adjust the print medium type at the personal computer prior to printing, fragile media, such as the above-discussed overhead transparency, may be damaged during the printing process.

Although non-contact optical sensors are commonly implemented in the media-handling axis of printer hardcopy output devices for print media detection purposes, the sensors are incapable of detecting a transparent medium unless an opaque appliqué is attached to the medium. While the opaque appliqué enables an optical sensor to detect the transparent medium, it creates numerous interface problems, increases the cost of the print medium to the end user and only enables the optical sensors to detect the edge of the medium on which the appliqué is located.

In addition, the above-discussed non-contact optical sensors are also incapable of sensing different types of non-transparent media such as, for example, paper and photographic media. It is important for printing purposes to distinguish between the two types of media, as the photographic medium is stiffer than paper and is similar to the overhead transparency medium in that it has poor absorbency and wetting characteristics and therefore a low dot gain.

Therefore, what is needed is a system that is capable of automatically adjusting the ink volume and application rate of a print device based on detected print media characteristics regardless of the type of print medium being used.

BRIEF DESCRIPTION OF THE DRAWINGS

Objects and advantages of the present invention will be more readily apparent from the following detailed description of the preferred embodiments thereof when taken together with the accompanying drawings in which.

BRIEF DESCRIPTION OF THE PREFERRED EMBODIMENTS

Figure 1:
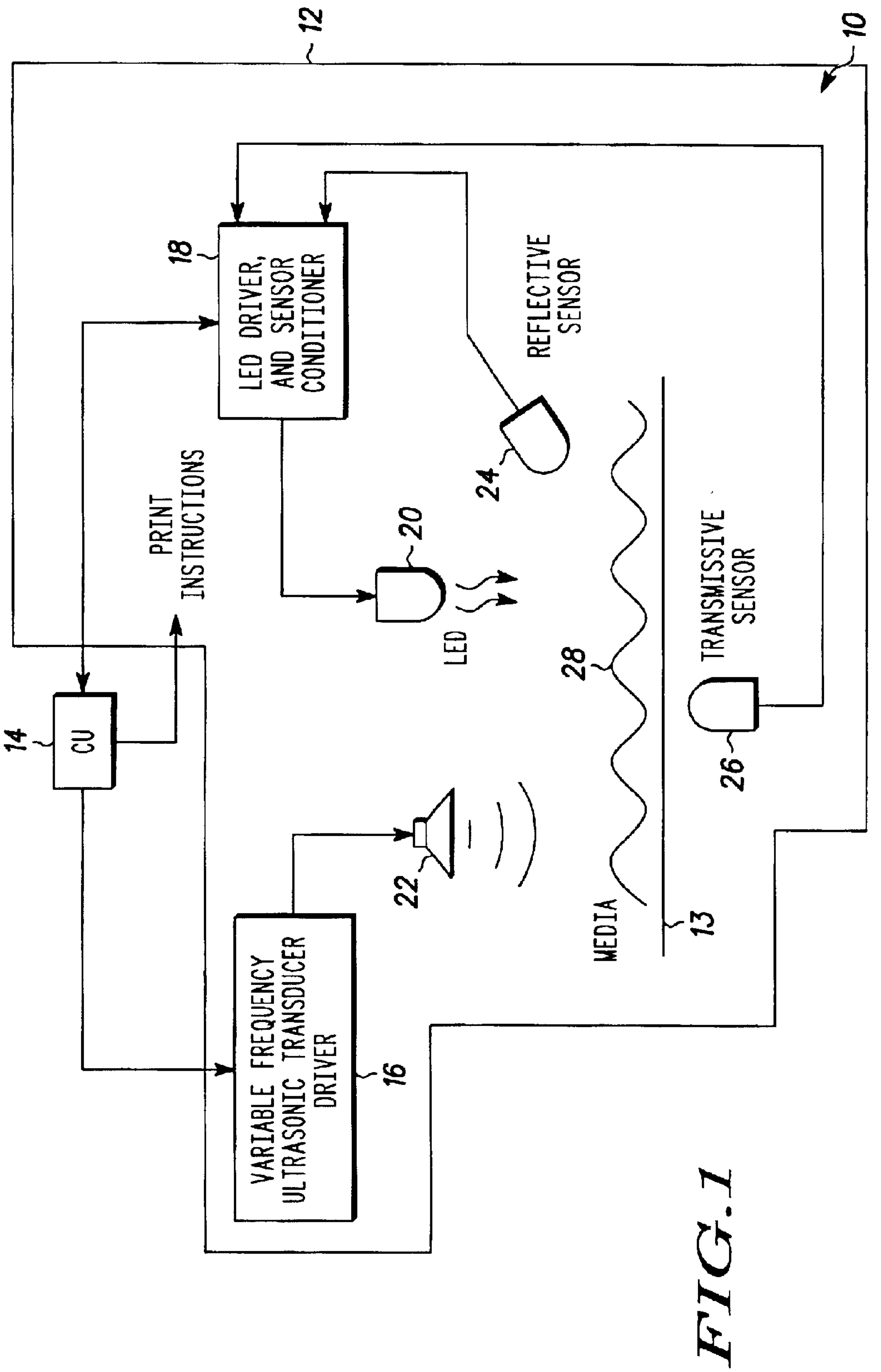
FIG. 1 is an exemplary view of a preferred embodiment of an ultrasonically assisted optical media sensor system in accordance with the present invention.

Referring now to the drawings in which like numerals reference like parts, FIG. 1 shows an ultrasonically assisted optical media sensor system (media sensor system) 10. The media sensor system 10 is implemented within or as part of a print device such as an inkjet printer 12 (shown in illustrative form and in relevant part by the irregular enclosure bordered by the line designated 12) at or near a pre-print area 13, and is preferably implemented to the extent practical and possible as an integrated circuit. The media sensor system 10 could also be implemented at or near a print device output area (not shown). The media sensor system 10 includes a control unit 14 in electronic communication with a variable frequency ultrasonic transducer driver 16, and a combined light emitting diode (LED) driver and sensor conditioner 18 in communication with an emitter such as an LED 20. The variable frequency ultrasonic transducer driver 16 is for driving an ultrasonic transducer 22 based on instructions received from the control unit 14, while the LED driver and sensor conditioner 18 is for driving the LED 20 based both on instructions received from the control unit 14 and on signals received from a reflective sensor 24 and a transmissive sensor 26. For example, the control unit 14, if local, the variable frequency ultrasonic transducer driver 16 and combined LED driver and sensor conditioner 18 are preferably included in an integrated circuit wile the specific mounting arrangements and requirements for the Led 20 and sensors 24, 26 suggests that they should be separate elements. The structure and function of each of the above-mentioned components of the media sensor system 10 will be discussed in detail below.

The control unit 14 is for controlling the various components of the media sensor system 10 through an associated print device control software program, preferably, stored therein. The control unit 14 also is for storing a lookup table of reflected LED light to transmitted LED light ratios associated with various print medium types, as well as a target ink volume and application rate associated with each of the print medium types, for use in a manner discussed below in more detail. The control unit 14 may be a central processing unit that is located remotely from the print device 12 in a host such as a personal computer (not shown) that controls the print device 12. Alternatively, the control unit 14 may be a local processor located along with the other components of the media sensor system 10 within the print device 12 if the print device 12 is, for example, a page description type printer.

The variable frequency ultrasonic transducer driver (ultrasonic transducer driver) 16 is preferably located within the print device 12, and the ultrasonic transducer 22 (16 and 22 collectively referred to as a driver) is positioned above a horizontal plane of the pre-print area 13 and preferably mechanically coupled or affixed to the inkjet printer 12. The ultrasonic transducer 22 can also be positioned below the horizontal plane of the pre-print area 13. Regardless, the ultrasonic transducer must be positioned so that it can deliver sufficient energy to vibrate the print medium 28. The ultrasonic transducer driver 16 and the ultrasonic transducer 22 can be any known driver and vibrating device capable of vibrating the print medium 28 at a predetermined frequency. Specifically, the ultrasonic transducer driver 16 is for activating the ultrasonic driver 22 based on instructions from the control unit 14. The ultrasonic transducer 22 is for transmitting ultrasonic signals to, and therefore vibrating, the print medium 28 so as to create standing waves within the print medium 28 based on instructions from the ultrasonic transducer driver 16. The standing waves are generated in the print medium 28 according to the specific mechanical properties of the medium 28 such as thickness, weight and rigidity. As will be discussed below, the control unit 14 utilizes the signals received from the sensor conditioner 18 to determine the type of the medium 28 as well as, for example, whether the medium 28 includes a particular type of coating.

The LED driver and sensor conditioner 18 is for controlling the amount of current that flows to the LED 20 based on signals it receives from the reflective and transmissive sensors 24, 26, and can be any known processor capable of controlling and electrically communicating with the sensors 24, 26. The LED driver and sensor conditioner 18 includes an analog to digital (A/D) converter (not shown) for converting analog signals received from the reflective and transmissive sensors 24, 26 to digital signals if the reflective and transmissive sensors 24, 26 do not include A/D processing capabilities.

The LED 20 is preferably affixed or mechanically coupled to the inkjet printer and is for irradiating the print medium 28 with radiation, preferably visible infrared light having a predetermined luminous intensity. The precise placement of the LED and the wavelength of the emitted radiation or light is not important as long as the reflective sensor 24 is capable of sensing that portion of the light that is reflected from the print medium 28, and as long as the transmissive sensor 26 is capable of measuring that portion of the light that is transmitted through the print medium 28. It is contemplated generally that any type of emitter other than the LED 20 may be used as long as it is capable of irradiating the print medium 28 with radiation of a predetermined luminous intensity that is detectable by the reflective and transmissive sensors 24, 26. The luminous intensity of the light transmitted by the LED 20 may be adjusted by, for example, increasing or decreasing the amount of electrical current being supplied to the LED 20 by the LED driver and sensor conditioner 18 to compensate for replacement of one type of LED with another type of LED, or to compensate for deterioration of the luminous intensity of the light emitted by the LED due to aging of the LED 20 or other factors that may cause a change in luminous intensity.

The reflective and transmissive sensors 24, 26 are for sensing, or measuring, irradiation characteristics of the light irradiated by the LED 20, and specifically the amount of reflected and transmitted light irradiated by the LED 20, respectively, and for generating and transmitting signals indicative thereof to the LED driver and sensor conditioner 18. The reflective and transmissive sensors 24, 26 may also optionally include respective A/D converters (not shown) if the LED driver and sensor conditioner 18 does not include these A/D processing capabilities.

The reflective sensor 24 is, preferably, mechanically coupled or affixed to the print device or inkjet printer 12 and is positioned above the pre-print area 13 at an angle of, for example, approximately 45° with respect to the horizontal plane of the pre-print area 13 and is in optical communication with the LED 20 for sensing an amount of light that is transmitted by the LED 20 and that is reflected by the print medium 28. The transmissive sensor 26 is, preferably, mechanically coupled or affixed to the print device or inkjet printer 12 and is positioned below the pre-print area 13 and is in optical communication with the LED 20 for sensing an amount of light that is transmitted by the LED 20 through the print medium 28. Both the reflective and transmissive sensors 24, 26 are positioned over a gap (not shown) in the pre-print area 13. Because the print medium 28 is unsupported over the gap, the ultrasonic transducer 22 can generate standing waves of vibration in the print medium 28. The reflective and transmissive sensors 24, 26 may be any electromechanical sensors capable of measuring light-related characteristics, such as an amount of light or an intensity of light.

Figure 2:
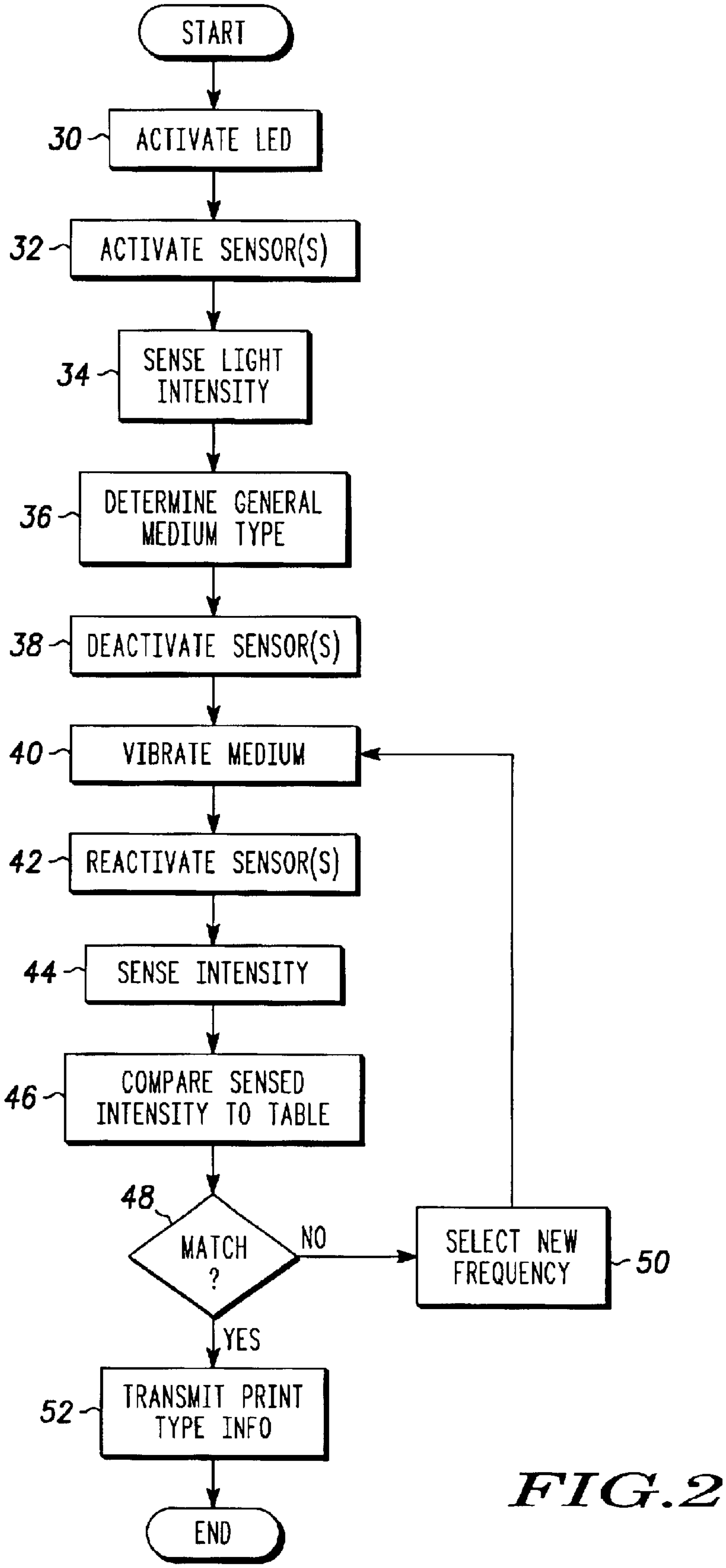
FIG. 2 is a flow diagram of a preferred embodiment process of determining a print medium type according to the present invention.
Figure 3:
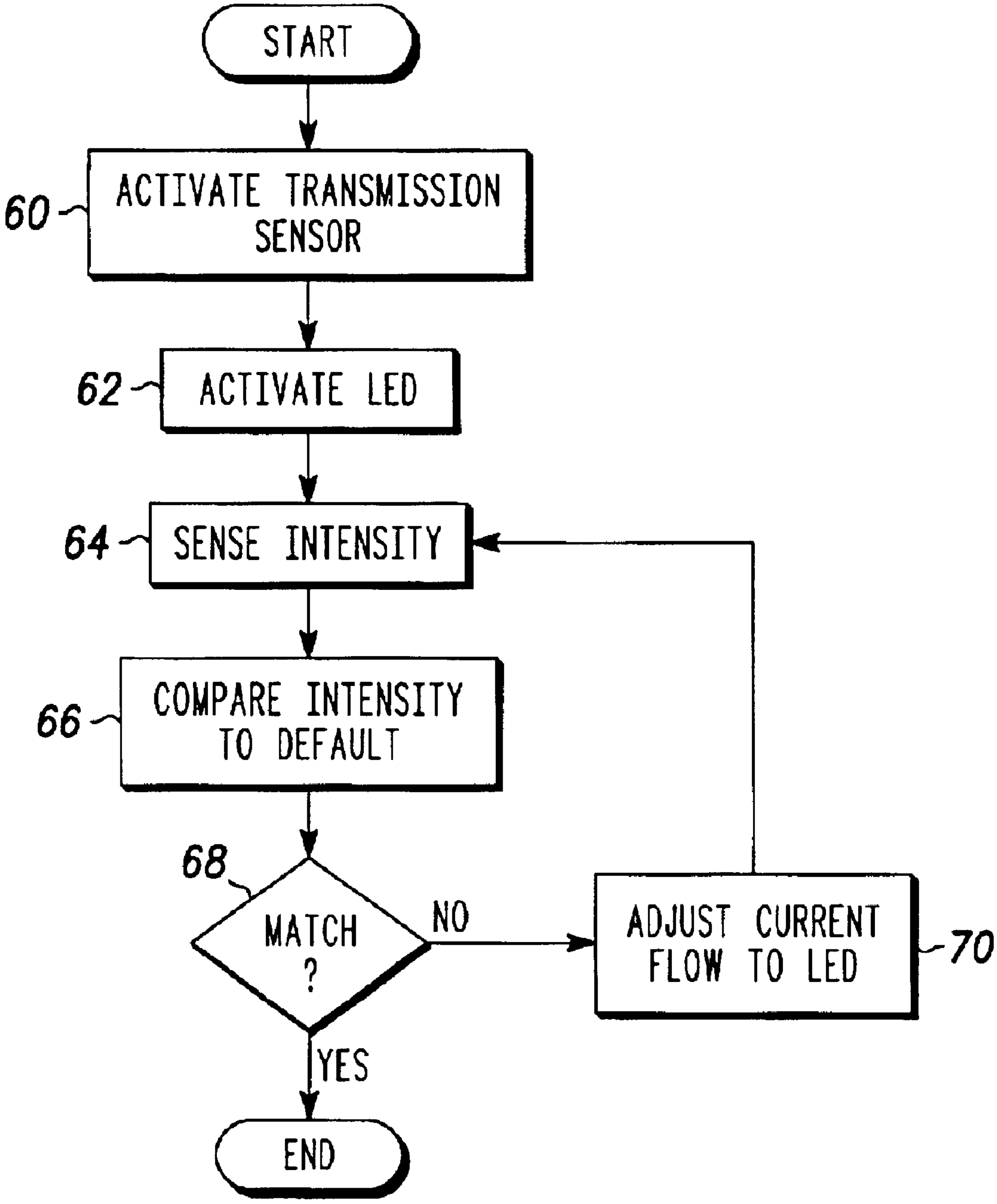
FIG. 3 is a flow diagram of a preferred process of calibrating a light emitting diode used for irradiation of a print medium according to the present invention.

Referring to FIGS. 2–3, operation of the media sensor system 10 will now be discussed. Initially, at 30 the control unit 14 instructs the LED driver and sensor conditioner 18 to activate the LED 20. The LED driver and sensor conditioner 18 subsequently activates the LED 20 so that the LED 20 irradiates the print medium 28 with light having a predetermined luminous intensity. At 32, the control unit 14 instructs the LED driver and sensor conditioner 18 to activate the reflective and transmissive sensors 24, 26. At 34, the reflective sensor 24 senses an amount of light irradiated by or from the LED 20 and reflected by the print medium 28, and the transmissive sensor 26 senses an amount of light irradiated by or from the LED 20 and transmitted through the print medium 28 prior to the print medium 28 being vibrated by the ultrasonic transducer 22. The reflective and transmissive sensors 24, 26 transmit analog signals (digital; signals if A/D converters included in sensors) indicative of reflected and transmitted light, respectively, to the LED driver and sensor conditioner 18. The LED driver and sensor conditioner 18 converts the analog signals to digital signals and transmits the signals to the control unit 14. At 36, the control unit 14 then determines generally the type of medium that is present (i.e., whether the print medium is paper or an overhead transparency) by comparing a ratio of the sensed amounts of reflected and transmitted light to ratios stored in the lookup table, where each ratio is associated with a specific type of print medium. Subsequently, at 38 the LED driver and sensor conditioner 18 deactivates the reflective and transmissive sensors 24, 26.

At 40, the control unit 14 instructs the ultrasonic transducer driver 16 to activate the ultrasonic transducer 22 to thereby vibrate the print medium 28 at a predetermined ultrasonic frequency based on the print medium information received from the LED driver and sensor conditioner 18 from 36 above. The ultrasonic transducer 22 subsequently transmits ultrasonic signals toward the surface of the print medium 28. At 42, the LED driver and sensor conditioner 18 re-activates the reflective and transmissive sensors 24, 26 subsequent to activation of the ultrasonic transducer 22 and preferably with enough delay to enable standing waves to be generated within the print medium 28 if, in fact, the predetermined ultrasonic frequency is the resonant frequency of the print medium 28.

At 44, the reflective sensor 24 senses the luminous intensity of the light irradiated by the LED 20 and reflected from the print medium 28 while the standing waves of vibration are being generated therein. Likewise, the transmissive sensor 26 senses the luminous intensity of the light irradiated by the LED 20 and transmitted through the print medium 28 while the standing waves of vibration are being generated therein. Both the reflective and transmissive sensors 24, 26 transmit analog signals indicative of the respective sensed luminous intensities to the LED driver and sensor conditioner 18. The LED driver and sensor conditioner 18 converts the analog signals from the reflective and transmissive sensors 24, 26 to digital signals, and transmits the digital signals to the control unit 14.

At 46, the control unit 14 determines the ratio of the sensed amount of reflected light (for example, 20%) to the sensed amount of transmitted light (for example, 80%) and compares this ratio to ratios for specific print mediums and corresponding print medium ink volume and application rates stored in the aforementioned lookup table. It should be noted, however, that the total percentage of reflected and transmitted light may not always equal 100% due to, for example, scattering of some portion of the light reflected from the print medium 28. The ratios stored in the lookup table are generated in a manner that takes such factors into consideration.

At 48, the control unit 14 determines whether it is able to match the calculated ratio to a stored ratio, and a print medium type associated with the stored ratio, in the lookup table. If the control unit 14 is unable to make such a match, it determines that the frequency at which the ultrasonic transducer 22 is being driven is not the resonance frequency of the print medium and therefore that standing waves are not being generated within the print medium 28.

Consequently, at 50 the control unit 14 instructs the ultrasonic transducer driver 16 to drive the ultrasonic transducer 22, and therefore vibrate the print medium 28, at a new frequency. The new frequency can be a randomly selected frequency or it can be a frequency that is above or below the default transmit frequency by a predetermined amount. The processing described above at 40–50 is then repeated until the print medium 28 is vibrated at its resonant frequency.

If at 48 the control unit 14 is able to match the calculated ratio to a stored ratio and therefore a print medium type and ink volume and application rate associated with the stored ratio, at 52 the control unit 14 transmits print medium type and corresponding ink volume and application rate information to the print device 12 to enable the characteristics with which the print device 12 prints indicia on the print medium 28 to be adjusted.

It should be noted at this point that the above process for determining a print medium type can be repeated until a print medium type is determined. Alternatively, a default process that enables a user to manually select a print medium type and corresponding ink volume and application rate can be activated at the control unit 14 if the above process does not determine a print medium type after a predetermined number of iterations.

Referring to FIG. 3, an LED calibration process or routine is performed by another preferred embodiment of the media sensor system 10 when, for example, the print medium 28 is not present in the pre-print area 13. This calibration routine is useful in compensating for variations in the luminous intensity of the light emitted by the LED 20 due to, for example, a change in the type of LED being used, or to compensate for deterioration in the luminous intensity of the light emitted by the LED 20 due to, for example, age, high usage, or dust accumulation. This calibration routine prevents the LED 20 from irradiating the print medium 28 with light having an inaccurate luminous intensity, and therefore prevents the skewing of subsequent print medium related calculations.

Specifically, at 60, the control unit 14 instructs the LED driver and sensor conditioner 18 to activate the transmissive sensor 26 either simultaneously with, or subsequent to, activation of the LED at 62. At 64, the transmissive sensor 26 senses the luminous intensity of the light emitted from the LED 20 and generates a signal indicative of this value. At 66, the LED driver and sensor conditioner 18 compares the sensed luminous intensity of the light emitted by the LED 20 to a default luminous intensity value stored therein. At 68, the LED driver and sensor conditioner 18 determines whether the sensed luminous intensity matches the default luminous intensity. If the luminous intensity values do not match, at 70 the LED driver and sensor conditioner 18 adjusts the current flow to the LED 20 based on how much the measured luminous intensity is above or below the default luminous intensity. The above determination process at 64–70 is then repeated until the measured and default luminous intensity values match within a reasonable tolerance. Once the two luminous intensity values match, the routine ends. However, the calibration routine can be periodically repeated as necessary under control of a user or volitionally by the control unit 14.

Note that the predetermined values and ratios will depend on a multiplicity of variables such as the particular LEDs and sensors utilized, the dimensions of the opening, the ultrasonic transducer characteristics, the nominal placement of these items relative to the print media and other surrounding structures, transmissibility and reflectivity of various media, etc. However it is also clear that one of ordinary skill, utilizing the principles and concepts discussed herein, can determine these values and settings without undue experimentation.

It should be noted at this point that the print media sensor system 10 of the present invention can be implemented in ways other than those discussed above without departing from the spirit or scope of the present invention. For example, the print media sensor system 10 may alternatively be implemented using only the reflective sensor 24 and not the transmissive sensor 26 if the lookup table stored in the control unit 14 is set up to associate print medium types and associated ink volume and application rate values with only reflected light percentage values. Also, the print media sensor 10 may be implemented using only the transmissive sensor 26 and only for purposes of calibrating the LED 20 as described above.

Alternatively, when the media sensor system 10 is implemented within the pre-print area 13, the reflective and transmissive sensors 24, 26 can be further utilized to perform top of form (TOF) and bottom of form (BOF) functions.

In addition, the print media sensor system 10 may alternatively be implemented in environments other than in a print device environment. For example, the print media sensor system 10 may be implemented in a photocopier environment, a facsimile environment, or in any other print medium-handling environment in which determination of the type of print medium being handled must be taken into consideration, with the lookup table associations being adjusted accordingly.

While the above description is of the preferred embodiment of the present invention, it should be appreciated that the invention may be modified, altered, or varied without deviating from the scope and fair meaning of the following claims.

What is claimed is:

1. A print media sensor device comprising:

a driver for vibrating a print medium to create standing waves therein;

an emitter for irradiating the print medium with radiation having a predetermined intensity;

a reflective sensor for sensing an amount of the radiation reflected from the print medium; and control means for determining a type of the print medium based on the amount of the radiation reflected from the print medium and sensed by the reflective sensor.

2. The device of claim 1, further comprising a transmissive sensor for sensing an amount of the radiation transmitted through the print medium; and wherein the control means is further for determining a type of the print medium based on the amount of the radiation reflected from the print medium and sensed by the reflective sensor and on the amount of the radiation transmitted through the print medium and sensed by the transmissive sensor.

3. The device of claim 2, wherein:

the transmissive sensor is further for sensing an amount of the radiation transmitted through the print medium while the print medium is vibrating;

the reflective sensor is further for sensing an amount of the radiation reflected from the print medium while the print medium is vibrating; and the control means is further for calculating a ratio between the amount of the radiation reflected from the print medium while the print medium is vibrating and the amount of the radiation transmitted through the print medium while the print medium is vibrating, and for comparing the ratio to a predetermined table of stored ratios, corresponding print medium types, and ink volume and application rate values to determine an ink volume and application rate for the print medium.

4. The device of claim 2, wherein the control means is further for determining if the amount of the radiation sensed by the transmissive sensor is indicative of deterioration of the emitter by comparing an amount of the radiation sensed by the transmissive sensor when the print medium is not present to a default value; and wherein the control means is further for adjusting an intensity of the radiation irradiated by the emitter if the amount of the radiation sensed by the transmissive sensor when the print medium is not present is indicative of the deterioration.

5. The device of claim 2, wherein:

the control means is further for calculating a ratio between the amount of the radiation sensed by the reflective sensor and the amount of the radiation sensed by the transmissive sensor and for comparing the ratio to a table of ratios, each associated with a print medium type to determine the type of the print medium, and the driver is further for vibrating the print medium at an alternative frequency to create the standing waves therein if the control means cannot determine the type of the print medium after comparing the ratio to the table of ratios, each associated with a print medium type.

6. The device of claim 2, wherein the control means comprises a control unit that is remotely located with respect to the ultrasonic driver, the emitter, the reflective sensor and the transmissive sensor.

7. The device of claim 2, wherein:

the emitter is further for irradiating the print medium with the radiation having the predetermined intensity prior to the driver vibrating the print medium to create the standing waves therein;

the reflective sensor is further for sensing an amount of the radiation reflected from the print medium prior to the driver vibrating the print medium;

the transmissive sensor is further for sensing an amount of the radiation transmitted through the print medium prior to the driver vibrating the print medium; and the control means further being for determining a type of the print medium based on a ratio of the amount of the radiation reflected from the print medium prior to the driver vibrating the print medium and the amount of radiation transmitted through the print medium prior to the driver vibrating the print medium.

8. The device of claim 1, wherein the emitter comprises a light emitting diode.

9. A method of determining a print medium type comprising:

vibrating a print medium at a predetermined frequency;

irradiating the print medium with radiation having a predetermined intensity level during the vibrating of the print medium at a predetermined frequency;

measuring an irradiation characteristic of the print medium during the irradiating of the print medium with radiation having a predetermined intensity level and the vibrating of the print medium at a predetermined frequency, wherein the measuring of an irradiation characteristic of the print medium further comprises measuring an amount of the radiation transmitted through the print medium; and comparing the measured irradiation characteristic to a table of stored irradiation characteristics and corresponding print medium types to determine a type of the print medium.

10. The method of claim 9, wherein:

the measuring of an irradiation characteristic of the print medium comprises measuring a ratio of an amount of radiation reflected from the print medium to the amount of radiation transmitted through the print medium; and the comparing of the measured irradiation characteristic to the table of stored irradiation characteristics and corresponding print medium types to determine the type of the print medium further comprises comparing the ratio of the amount of radiation reflected from the print medium to the amount of radiation transmitted through the print medium with a table of stored ratios and the corresponding print medium types to determine the type of the print medium.

11. The method of claim 9, wherein the measuring of an irradiation characteristic of the print medium further comprises measuring an amount of the radiation reflected from the print medium.

12. The method of claim 9, further comprising adjusting an ink volume and application rate based on the comparing of the measured irradiation characteristic to a table of stored irradiation characteristics and corresponding print medium types to determine the type of the print medium.

13. The method of claim 9, further comprising:

irradiating the print medium with the radiation having the predetermined intensity level prior to the vibrating of the print medium at the predetermined frequency;

measuring an irradiation characteristic of the print medium during the irradiating of the print medium; and comparing the irradiation characteristic to the table of stored irradiation characteristics to determine a general type of the print medium level prior to the vibrating of the print medium at the predetermined frequency.

14. The method of claim 9, further comprising:

measuring a luminous intensity of an emitter device when the print medium is not present;

comparing the luminous intensity of the emitter device to a default luminous intensity value; and adjusting the luminous intensity of the emitter device based upon the comparing of the luminous intensity of the emitter device to a default luminous intensity value.

15. The method of claim 9, further comprising:

vibrating the print medium at alternative frequencies until standing waves are generated therein if, after the measuring of an irradiation characteristic of the print medium, it is determined that the measured irradiation characteristic of the print medium differs from all values in the table of stored irradiation characteristics by more than a specific amount.

16. A system for determining a print medium type comprising:

an ultrasonic driver for vibrating a print medium at a resonant frequency of the print medium;

a light emitting diode for irradiating the print medium with light having a predetermined luminous intensity;

a transmissive sensor for sensing a percentage of the light transmitted through the print medium while the print medium is vibrating at the resonant frequency;

a reflective sensor for sensing a percentage of the light reflected from the print medium while the print medium is vibrating at the resonant frequency; and control means for comparing a ratio of the percentage of the light transmitted through the print medium to the percentage of the light reflected from the print medium with a table of default ratios with corresponding print medium types and ink volume and application rates to determine an ink volume and application rate for the print medium.

17. The system of claim 16 wherein:

the transmissive sensor is further for sensing a percentage of the light transmitted through the print medium prior to the print medium being vibrated at the resonant frequency;

the reflective sensor is further for sensing a percentage of the light reflected from the print medium prior to the print medium being vibrated at the resonant frequency; and the control means is further for comparing a ratio of the percentage of the light transmitted through the print medium prior to the print medium being vibrated at the resonant frequency to the percentage of the light reflected from the print medium prior to the print medium being vibrated at the resonant frequency to the table of default ratios to determine a general print medium type.

18. The system of claim 16 wherein:

the transmissive sensor is further for sensing the predetermined luminous intensity of the light irradiated by the light emitting diode when no print medium is present;

the control means is further for comparing the predetermined luminous intensity of the light irradiated from the light emitting diode when no print medium is present to a stored default value to determine if the light emitting diode needs to be calibrated, and for adjusting the predetermined luminous intensity of the light irradiated by the light emitting diode if the predetermined luminous intensity differs from the default value.

19. The system of claim 18, wherein the control means adjusts the predetermined luminous intensity of the light irradiated by the light emitting diode by adjusting a current flow to the light emitting diode.

* * * * *